Oct. 15, 1963

A. V. SUNDAY 3,106,746

EXTRUSION HEAD

Filed Aug. 30, 1961

INVENTOR.
ANDREW V. SUNDAY
BY
Meyer, Baldwin, Doran & Egan
ATTORNEYS

INVENTOR.
ANDREW V. SUNDAY
BY
Meyer, Baldwin, Doran & Egan
ATTORNEYS

INVENTOR.
ANDREW V. SUNDAY
BY
Meyer, Baldwin, Doran & Egan
ATTORNEYS

United States Patent Office 3,106,746
Patented Oct. 15, 1963

3,106,746
EXTRUSION HEAD
Andrew V. Sunday, 9904 Manor Ave., Cleveland, Ohio
Filed Aug. 30, 1961, Ser. No. 134,985
12 Claims. (Cl. 18—12)

This invention relates to extrusion machines and more particularly to an extrusion head for use in such machine in the manufacture of tubing or the like.

Conventional apparatus for the extrusion of tube stock comprises means for conveying the material under pressure through a heated chamber wherein the material is thoroughly plasticized; subsequently it is caused to flow in a path which is substantially annular in section to a circumferentially continuous die opening from which it issues in the form of a continuous tube. In providing the annular path for the melt to follow, a centrally disposed separator member is commonly provided in the path of the flowing material around which the material is forced to pass, and a plurality of radiating, bladelike members or webs are used to maintain the separator in its central position. Each web provides an obstacle which divides the flowing melt into separate streams which are arcuate in section, and although the final die opening is circumferentially continuous, thereby allowing the plasticized material to reunite before being extruded, the resulting tube material is provided at its inner surface with undesirable grooves or web lines where the material converged after passing the webs.

These web lines are due partly to the presence of the bladelike members which physically separate the flowing material and partly to the fact that the material is generally more thoroughly heated adjacent its outer surface then adjacent its inner surface. Heat is conventionally applied to the outer surface of the heating chamber, and the result is that the material adjacent the wall of the chamber is hotter than the material disposed adjacent the centrally disposed separator. The extruding melt, therefore, more readily reunites or fuses at the outer surface of the tube than at the inner surface thereof, and this causes the formation of web lines on the inner surface of the tube.

A general object of this invention is to provide an extrusion head for extruding thermoplastic material in the form of a tube wherein the tube is smooth and free from web lines at both the outer and inner surfaces thereof.

Another object of the invention is to provide an extrusion head which effects a uniform distribution of heat in the flowing melt prior to its extrusion.

A more specific object of the invention is to provide an extrusion head wherein the flowing melt is divided and substantially diametrically reversed in such manner that the material adjacent the outer surface of the stream becomes the material adjacent the inner surface of the extruded tubing.

Another specific object of the invention is to provide an extrusion head having a crossover member providing two separate passages therethrough, each passage being so formed as to cause the flowing melt to enter said member in an arcuate stream, pass across the other passage, and issue from said member in an arcuately opposite form.

Further objects of the invention and the invention itself will be understood from the following specification and the accompanying drawings, in which said drawings.

Figure 1:
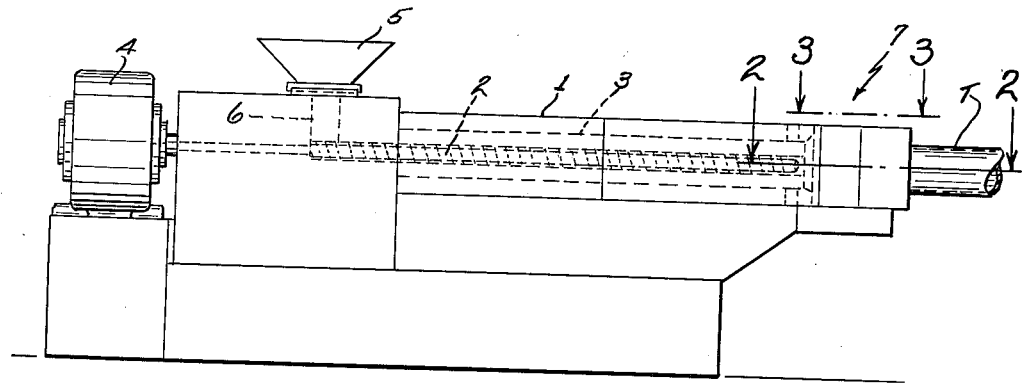
FIG. 1 is a side elevation of an extrusion machine showing the extruder head of this invention attached thereto.

Referring now to the drawings, FIG. 1 illustrates, by way of example, a typical extrusion machine to which the extrusion head of this invention is attached. This machine, as illustrated, is adapted for the extrusion manufacturing of a continuous tubular article made from one of the well-known plastic materials such as vinyl, high molecular weight polyethylene, or other thermoplastic material. It will be understood that the following description of this machine is given only by way of illustrating the location and significance of the present invention and is in no way intended as a limitation thereof.

The extruding machine of FIG. 1 comprises, generally, a housing 1 containing a horizontally disposed screw conveyor 2 which is mounted within a heated barrel 3 and is rotatively driven at one end thereof by means of a motor 4. The unplasticized material is contained within a hopper 5 mounted on top of the housing 1 and passes downwardly through a feed port 6 whereby said material is fed into the barrel 3.

The unplasticized material is conveyed forwardly through the barrel 3 in the direction opposite the motor 4 toward an extrusion head 7 which is mounted to the forward end of said barrel and from which it issues in the form of a tubular article T. As the material moves forwardly, it is progressively plasticized by the heated barrel whereby it is in a semiliquid state when it reaches the extrusion head 7. Conventional breaker means (not shown) may be interposed in the area of the extrusion head to strain, mix, and churn the material prior to its being extruded if so desired. For the purpose of describing the extrusion head of this invention it will be assumed that the melt reaches the extrusion head in a thoroughly plasticized and mixed condition.

Figure 2:
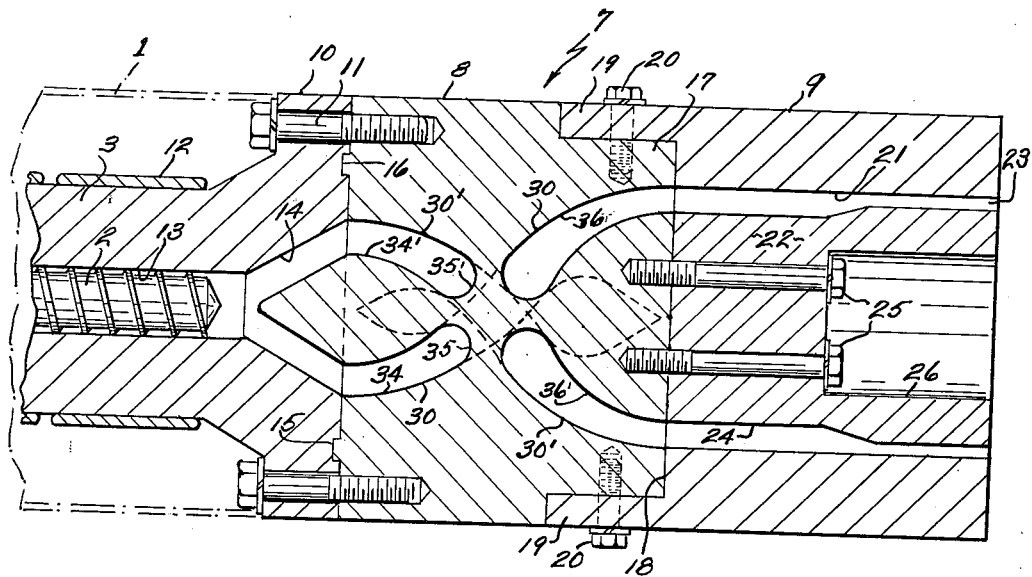
FIG. 2 is an enlarged horizontal section of the extrusion head taken along the line 2—2 of FIG. 1.

Referring now particularly to FIG. 2, the extrusion head 7 comprises two main components, a crossover member 8 and an extrusion die 9. The barrel 3 is provided at its forward end with a rectangular flange 10 of substantially the same dimensions as the cross over member 8 which is bolted to said flange by means of a plurality of bolts 11. The main body of the barrel 3 is provided with suitable heating means in the form of heater bands 12 of the electrical resistance type. The heater bands 12 heat the barrel 3 to such elevated temperature that the material passing therethrough is thoroughly plasticized by the time it reaches the area of the flange 10. The screw conveyor 2 closely interfits a central bore 13 of the barrel 3, said bore terminating at the forward end of the barrel in a forwardly diverging frustoconical mouth 14.

The crossover member 8 comprises, generally, a block of steel or similar material having a rearwardly projecting, annular boss 15 which closely interfiits an annular groove 16 in the forwardly directed face of the barrel 3. The boss and groove surround and are radially spaced from the open end of the mouth 14 and serve as aligning means between the barrel and the crossover member and also provide an effective seal between the members to prevent escape of the melt therebetween.

The forward end of the crossover member 8 is laterally inwardly stepped at either side thereof to provide a forwardly projecting, reduced portion 17. The extrusion die 9 is complementarily slotted adjacent its rearwardly directed end as indicated at 18 to fit snugly over the reduced portion 17 of the crossover member. The effect of this construction is to provide a pair of rearwardly projecting, laterally spaced wall portions 19 of the die which overlap the lateral sides of the reduced portion 17 of the crossover member 8, and the two members are rigidly secured together by means of laterally inwardly projecting bolts 20.

The extrusion die 9 is centrally bored at 21, and a supplemental die member 22 is disposed concentrically within the bore 21 in radially inwardly spaced relation to the concave wall of said bore. The forwardly directed end of the supplemental die member 22 is flush with the forward end of the extrusion die 9, and the die and supplemental die member afford a circumferentially continuous die opening around said supplemental die member as indicated at 23. The rearwardly directed end of the supplemental die member is diametrically uniformly reduced as shown at 24, and said supplemental die member is rigidly and firmly mounted against the forwardly directed surface of the crossover member 8 by means of a bolt 25 projecting rearwardly from the bottom of a forwardly open socket 26 therein. The bolts 11, 20 and 25 are thread fitted within the crossover member 8 whereby the barrel, crossover member, extrusion die, and supplemental die member are all securely united.

Figure 6:
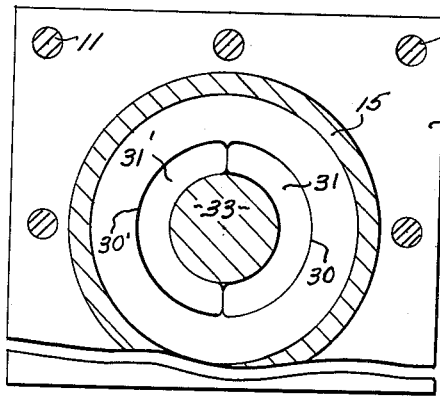
FIG. 6 is a transverse section taken along the line 6—6 of FIG. 5.
Figure 7:
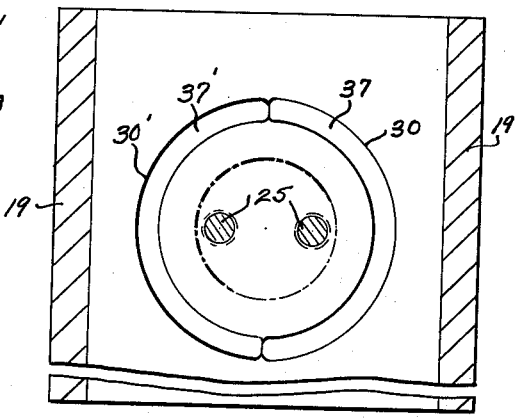
FIG. 7 is a tranverse section taken along the line 7—7 of FIG. 5.
Figure 8:
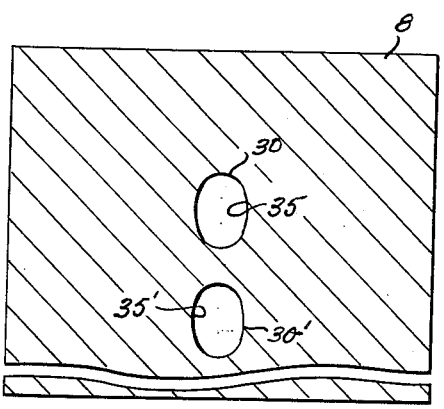
FIG. 8 is a transverse section taken along the line 8—8 of FIG. 5.
Figure 9:
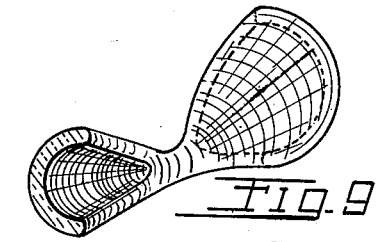
FIG. 9 is a perspective view showing, as a solid, the form which the plasticized material takes as it flows through one of the passages in the crossover member.

Referring now to FIGS. 2–5, the plasticized material or melt passes from the barrel 3 into the extrusion die 9 by means of a pair of similar through passages 30 and 30' in the crossover member 8. The passages 30 and 30' are substantially mirror images of each other, and like parts thereof will be designated by like reference numerals with the exception that those parts or areas associated with the passage 30' will have the numbers thereof primed. FIGS. 6 and 7 show respectively the entrance and exit ends of the passages 30 and 30', and it will be understood that except for a small area immediately adjacent the forward and rearwardly directed faces of the crossover member 8, the passages 30 and 30' do not connect or in any way intercommunicate within the body of said crossover member.

Figure 4:
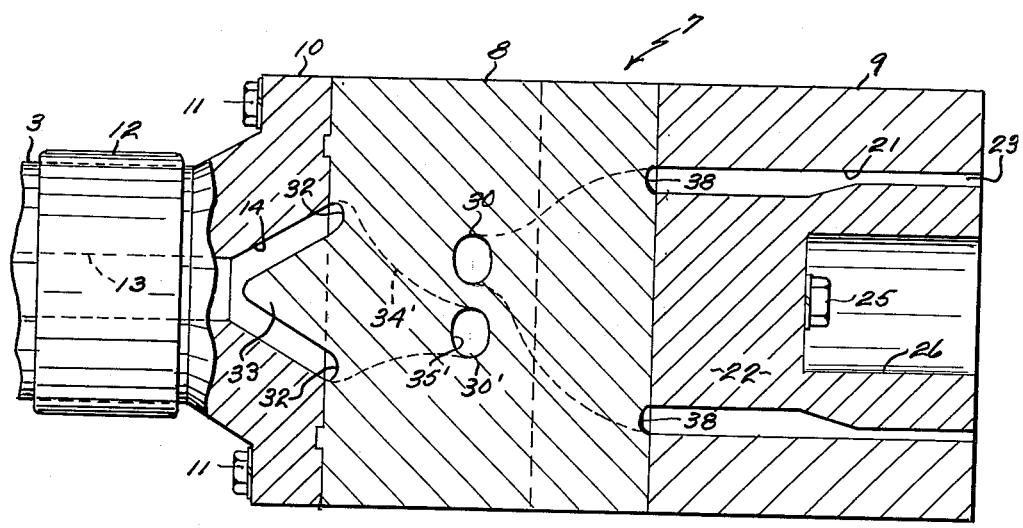
FIG. 4 is a longitudinal section taken along the line 4—4 of FIG. 3.

As shown in FIG. 6, each passage 30 and 30' begins or enters the block or crossover member 8 at its upstream face in the form of a semicircular mouth 31 or 31'. The openings 31 and 31' are slightly forwardly recessed from the rearwardly directed face of the crossover member 8 as best shown in FIG. 4 whereby the two passages intersect at two relatively sharp edges 32 disposed 180° apart. The crossover member 8 has a rearwardly projecting, cone shaped spreader 33 which projects into the frustoconical mouth 14 of the bore 13 in uniformly spaced relation thereto whereby the melt coming from the bore 13 of the barrel 3 is spread along a cone shaped path as it moves through the mouth portion 14 just before it is divided at the edges 32 and directed into the arcuate entrance openings 31 and 31' of the passages 30 and 30' respectively.

Figure 3:
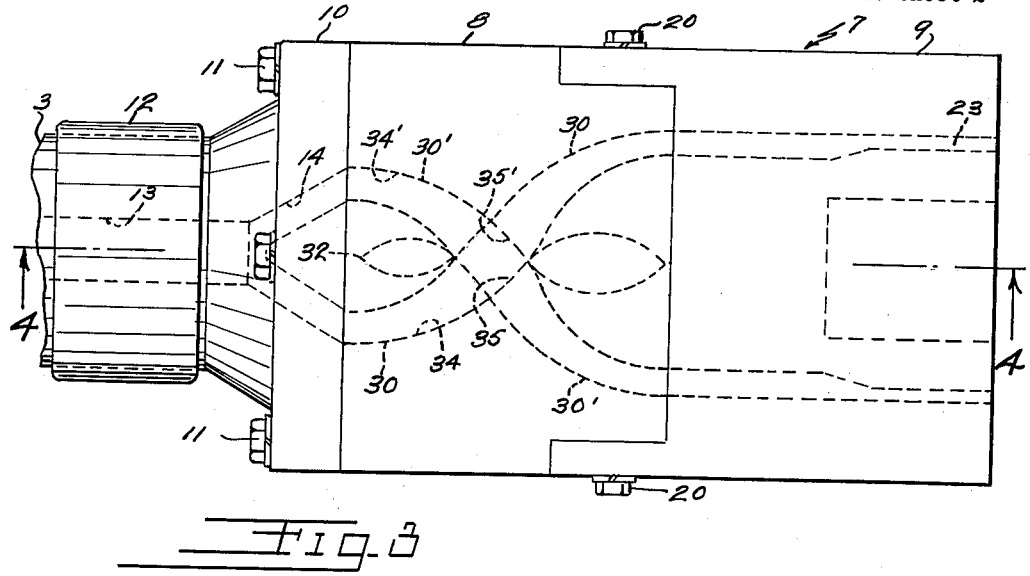
FIG. 3 is a top plan view of the extrusion head as seen from the line 3—3 of FIG. 1.
Figure 5:
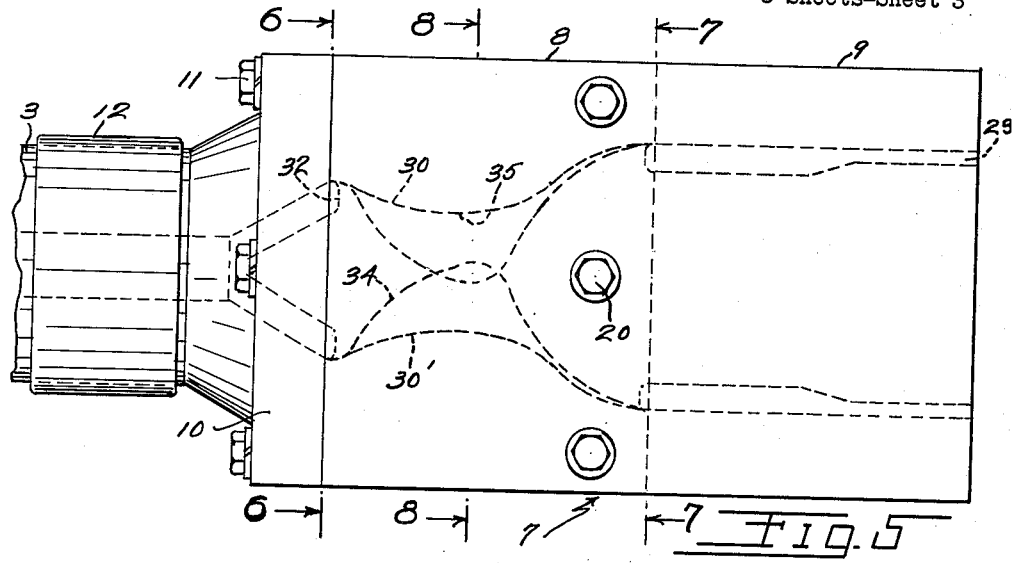
FIG. 5 is a side plan view of the extrusion head.

As best seen in FIGS. 4 and 5, the passage 30' has a tapered portion 34' adjacent the entrance thereof wherein the arc of said passage 30' becomes progressively flattened and less pronounced until, in the medial region of the crossover member 8, the passage becomes substantially circular or ovular in shape as indicated at 35'. In a similar manner, the passage 30 has a transitional area 34 in which said passage 30 becomes increasingly cylindrical and eventually blends into a circular or ovular center portion shown at 35. It will also be noted in FIGS. 4 and 5 that the passages 30 and 30' move respectively upwardly and downwardly as they progress through the crossover member and as they change to a more circular shape whereby the passage 30 crosses over top of the passage 30' in the medial region of the crossover member. As shown in FIGS. 2 and 3, while the passages 30 and 30' are passing respectively above and below each other in the forward direction they are also converging toward each other whereby they cross to opposite lateral sides of the crossover member in the generally medial region thereof.

As the passages 30 and 30' pass the medial region of the crossover member moving in a forward direction they substantially reverse themselves as to shape. The passage 30 moves diametrically to the opposite side of the crossover member, or that side at which the passage 30' enters, while concurrently assuming an arcuate shape opposite to that which it had at the forward end of said member. This transition provides a second tapered portion 36 which becomes progressively more arcuate as it moves in a forward direction until, adjacent the forwardly directed face of the crossover member, it is again semicircular in form although arcuately opposite from the shape of its entrance portion.

In a similar manner the passage 30' has a tapered portion 36' which becomes progressively more arcuate as it moves forwardly in the direction of the forward or exit end of the crossover member 8. As best seen in FIG. 7, the passages 30 and 30' converge in semicircular openings 37 and 37' adjacent the exit or downstream end of the crossover member, the convergence of the two passages being recessed slightly thereby affording a pair of relatively sharp edge portions 38 (FIG. 4) which are recessed slightly from the forwardly directed face of the member. The combination of the semicircular openings 37 and 37' provide a circular or circumferentially continuous opening which is in register with the annular space between the reduced portion 24 of the supplemental die member 22 and the concave inner wall of the bore 21 of the extrusion die 9. The larger portion of the supplemental die member 22 adjacent the die opening 23 provides a restricted area adjacent the mouth of the die which substantially defines the thickness of the tube T to be extruded therefrom and effects sufficient back pressure on the melt to insure proper extrusion of the tube.

As herein illustrated, the entrance openings 31 and 31' are substantially smaller diametrically than the exit openings 37 and 37', but it will be understood that the entrance and exit openings may be of the same diameter or the latter might conceivably be smaller than the former in some applications of the device. However, it is preferred that regardless of shape the cross-sectional area or flow capacity be substantially uniform throughout the length of each passage.

From the foregoing it will be understood that the melt from the barrel 3 is forced around the conical spreader 33 where it is equally divided and forced into the arcuate entrance openings 31 and 31' of the passages 30 and 30'. As the melt moves through each of the passages, it is progressively flattened and then arcuated in the opposite direction at the forward end of the crossover member 8 whereby the material which entered said member on one side of a vertical plane through the longitudinal center of said member issues into the die on the opposite side of said plane in an oppositely curved arc. The radially inwardly positioned plastic at the entrance moves through the crossover member to the radially outward position at the discharge end. The result is that the portion of the melt which was adjacent the wall of the mouth 14 of the barrel 3 on the entrance side of the crossover member is disposed adjacent the outer peripheral surface of the supplemental die member 22 when it issues into the extrusion die 9. Thus the outwardly disposed material, which is of a higher temperature than that disposed radially inwardly thereof due to its closer proximity to the heater bands 12, has been reversed and that which would normally constitute the outer portion or surface of the extruded tube in prior practice now constitutes the inner portion or surface thereof in this invention. The effect of this reversal of the material is to give to the melt a uniform heat distribution throughout the thickness of the walls of the extruded tube; and the converging material which is being propelled from the two passages at the exit end of the crossover member, because it is more uniformly heated, unites into the desired cylindrical form free from web lines at either the outer or the inner surface thereof.

The terms "tube" and "tubular" as used herein are not intended to be limited or refere only to an article of circular or cylindrical cross-section. This invention may be readily used in the manufacture of noncircular, closed-wall articles such as square or rectangular tubing, and it will be readily understood that for such adaptation the shapes of the exit openings (37, 37') would be correspondingly modified.

It is anticipated that additional heater bands (not illustrated) may be provided around the crossover member 8 as deemed necessary for maintaining a given thermoplastic material at the proper temperature for the extrusion thereof. It is also anticipated that with some types of thermoplastic material it would be desirable to cool the crossover member, and this may be done by any suitable means such as a water jacket or fluid passages through said member (not illustrated).

It will be understood that many changes may be made in the details of this invention, only one embodiment of which is herein described and illustrated, without, however, departing from the spirit thereof or the scope of the appended claims.

What is claimed is:

1. A crossover member for an extrusion machine, adapted to be disposed in a confined path of flowing melt and comprising means providing a pair of separate passages through which the melt flows; said passages having entrance and exit openings respectively defining portions of a closed-wall article in section; said passages passing around each other in the medial region of said member and substantially reversing their shapes in such manner that melt entering the entrance opening of one of said passages issues from said member substantially diametrically opposite its position of entry.

2. A crossover member as set forth in claim 1 wherein the recited entrance and exit openings are substantially arcuate in shape.

3. A crossover member as set forth in claim 1 wherein the recited entrance and exit openings are semicircular in shape and circumferential extent, whereby the melt enters and leaves said member in a tubular form.

4. A crossover member as set forth in claim 3 wherein the recited passages taper inwardly from adjacent said entrance and exit openings becoming progressively less arcuate and increasingly cylindrical in the medial region of said member.

5. A crossover member as set forth in claim 4 wherein said passages are of such circumferential extent adjacent said entrance and exit openings as to converge and afford sharp edge portions disposed substantially 180° apart at either circumferential limit of said openings.

6. An extrusion head for extruding plasticized material in the form of a tubular article, said extrusion head comprising a crossover member adapted to be disposed in a path of flowing material; an extrusion die disposed downstream from said member; said die providing a circumferentially continuous die opening through which the material flows and from which it issues in tubular form; means providing a pair of separate passages through said member for directing the material into said die; said passages having complementary arcuate entrance openings; said passages become progressively less arcuate in the longitudinal medial region of said member and passing around each other; said passages reversing their arcuation and becoming increasingly arcual in the direction of flow from said medial region; said passages having complementary arcuate exit openings adjacent and in reigster with said die opening with each said exit opening curved oppositely from the curvature of the entrance opening of the same passage.

7. An extrusion head as set forth in claim 6 wherein the recited entrance and exit openings are semicircular in shape and circumferential extent, whereby the melt enters and leaves said member in a tubular form.

8. An extrusion head as set forth in claim 7 wherein said passages converge at said entrance and exit openings in such manner as to afford sharp edge portions disposed substantially 180° apart at either circumferential limit of said openings.

9. An extrusion head as set forth in claim 7 wherein the recited crossover member has a cone-shaped spreader projecting upstream therefrom; said spreader being concentrically disposed relative to said entrance openings and providing a conical surface for directing the flowing material into said entrance openings.

10. An extrusion head as set forth in claim 7 wherein the recited crossover member has parallel entrance and exit faces; said entrance and exit openings disposed in said entrance and exit faces respectively; said passages merging with each other adjacent said faces and slightly recessed therefrom.

11. A crossover member for an extrusion machine adapted to be disposed in a confined path of flowing melt comprising means providing a pair of separate passages extending longitudinally through said member through which the melt flows in two separate streams; said passages having entrance and exit openings respectively defining portions of a closed-wall article in section; said entrance openings disposed on either side of a plane through the longitudinal center of said member with the corresponding exit openings of the same passages disposed on opposite sides of said plane; said passages passing around each other to the opposite side of said plane and progressively reversing their shapes in the medial region of said member whereby the stream which enters on one side of said plane issues from an exit opening on the other side of said plane and the portion of said stream which is positioned radially inwardly at the entrance opening is disposed radially outwardly at the corresponding exit opening.

12. Crossover means adapted to be disposed in a confined elongated path of flowing material having a central axis, comprising plural passage means directing the flow of material in such manner that the radially inwardly positioned material at the entrance of said crossover means moves through said crossover means to the radially outward position at the discharge end of said crossover means, said passage means being circumferential in extent at each end of said path, and each said passage means being independent of the other.

References Cited in the file of this patent

UNITED STATES PATENTS

| 2,253,460 | Hempel | Aug. 19, 1941 |
| 2,669,750 | Keeney | Feb. 23, 1954 |
| 2,766,483 | Stokes | Oct. 16, 1956 |

FOREIGN PATENTS

| 929,239 | France | July 7, 1947 |
| 1,181,407 | France | Jan. 12, 1959 |
| 1,227,579 | France | Mar. 7, 1960 |